(12) United States Patent
Hirai et al.

(10) Patent No.: US 6,307,380 B1
(45) Date of Patent: Oct. 23, 2001

(54) DISTANCE MEASURING APPARATUS

(75) Inventors: Eiichi Hirai, Tokyo; Seiji Toda, Kyoto; Naomasa Oshie, Osaka; Masayuki Miki, Shiga, all of (JP)

(73) Assignee: Levex Corporation, Kyoto (JP)

( * ) Notice: Subject to any disclaimer, the term of this patent is extended or adjusted under 35 U.S.C. 154(b) by 0 days.

(21) Appl. No.: 09/422,703

(22) Filed: Oct. 21, 1999

(30) Foreign Application Priority Data

Oct. 26, 1998 (JP) .................................... 10-343534

(51) Int. Cl.[7] ........................... G01R 31/08; G01R 31/11; G01R 27/04; G01N 27/00
(52) U.S. Cl. .......................... 324/533; 324/532; 324/633; 324/637; 324/634; 324/71.1
(58) Field of Search ..................... 324/600, 532, 324/633, 637, 642, 644, 71.1, 533, 638

(56) References Cited

U.S. PATENT DOCUMENTS

| | | | | |
|---|---|---|---|---|
| 3,727,128 | * | 4/1973 | McFerrin | 324/533 |
| 4,005,363 | * | 1/1977 | Mifflin | 324/642 |
| 4,165,482 | * | 8/1979 | Gale | 324/523 |
| 4,176,339 | * | 11/1979 | Konrad | 367/121 |
| 4,853,950 | * | 8/1989 | Crane | 379/24 |
| 5,083,086 | * | 1/1992 | Steiner | 324/533 |
| 5,352,994 | * | 10/1994 | Black et al. | 333/33 |
| 5,600,248 | * | 2/1997 | Westrom et al. | 324/522 |
| 5,748,002 | * | 5/1998 | Scott et al. | 324/633 |
| 6,137,293 | * | 12/1998 | Wu et al. | 324/638 |

OTHER PUBLICATIONS

Jong et al., Time–Domain Characterization of Interconnect Discontinuities in High–Speed Circuits, IEEE Transaction on Components 1992.*

Burkhart et al., Arbitrary Pulse Shape Synthesis via Non-uniform Transmission Lines, IEEE Transaction on Microwaves 1990.*

\* cited by examiner

*Primary Examiner*—Glenn W. Brown
*Assistant Examiner*—Wasseem H. Hamdan
(74) *Attorney, Agent, or Firm*—Jordan and Hamburg LLP

(57) ABSTRACT

While a high-frequency pulse is introduced at one end of a parallel conductor which is simulated as in an impedance equivalent state, an impedance mismatch generator is mounted to an intermediate region of the parallel conductor. As the impedance mismatch generator has produced a reflected wave of the pulse, a duration before the reflected wave is received at the one end is measured and multiplied by the propagation speed of voltage to calculate the distance from the pulse introducing point at the one end of the parallel conductor to the impedance mismatch generator.

6 Claims, 18 Drawing Sheets

A BLOCK DIAGRAM OF A DISTANCE DETECTOR

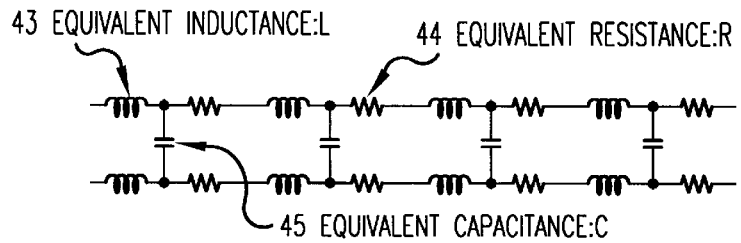

AN EQUIVALENT CIRCUIT OF A PARALLEL CONDUCTOR
SIMULATED IN AN UNIFORM DISTRIBUTION

FIG. 1

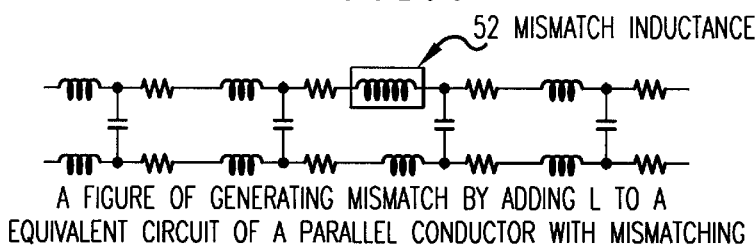

A FIGURE OF GENERATING MISMATCH BY ADDING L TO A
EQUIVALENT CIRCUIT OF A PARALLEL CONDUCTOR WITH MISMATCHING

FIG. 2A

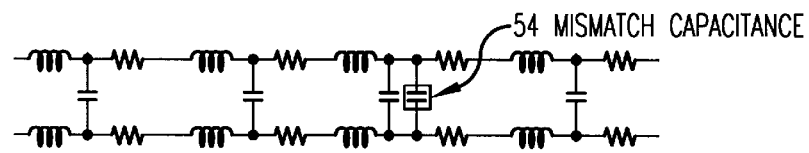

A FIGURE OF GENERATING MISMATCH BY ADDING C TO A
EQUIVALENT CIRCUIT OF A PARALLEL CONDUCTOR WITH MISMATCHING

FIG. 2B

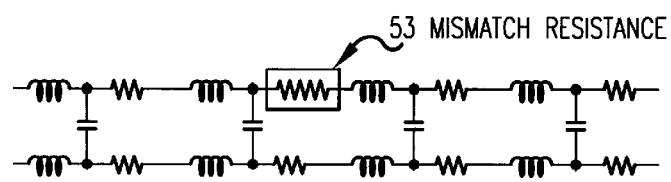

A FIGURE OF GENERATING MISMATCH BY ADDING R TO A
EQUIVALENT CIRCUIT OF A PARALLEL CONDUCTOR WITH MISMATCHING

FIG. 2C

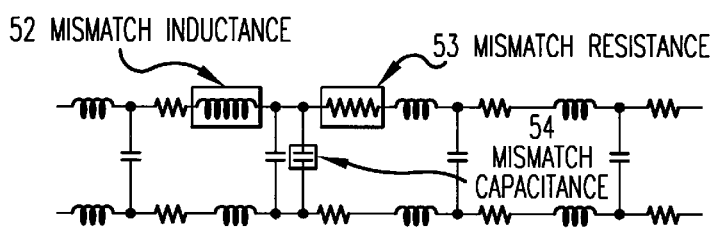

A FIGURE OF GENERATING MISMATCH BY ADDING L,C,R TO A
EQUIVALENT CIRCUIT OF A PARALLEL CONDUCTOR WITH MISMATCHING

FIG. 2D

POSITION OF A MISMATCH GENERATOR ON A PARALLEL CONDUCTOR

THE TIMING CHART OF INTRODUCING PULSE

THE PRIMARY REFLECTED WAVE WHEN THE POSITION OF MISMATCH GENERATOR IS 0(m)

THE PRIMARY REFLECTED WAVE WHEN THE POSITION OF MISMATCH GENERATOR IS L1(m)

THE REFLECTED VOLTAGE WHEN THE POSITION OF MISMATCH GENERATOR IS L0(m)

THE PRIMARY REFLECTED WAVE WHEN THE POSITION OF IMPEDANCE MISMATCH GENERATOR IS 0(m)

THE SHAPE OF REFLECTED WAVE WHEN THE POSITION OF IMPEDANCE MISMATCH GENERATOR IS L1(m)

THE SHAPE OF REFLECTED WAVE WHEN THE POSITION OF IMPEDANCE MISMATCH GENERATOR IS L1=Lt

A BLOCK DIAGRAM OF A DISTANCE DETECTOR

GENERATING MISMATCH BY BREAKING

GENERATING MISMATCH BY SHORT-CIRCUITING

GENERATING MISMATCH AS THE CHANGE OF INDUCTANCE
BY A MAGNET RING OR A COIL

GENERATING MISMATCH AS THE CHANGE OF STATIC CAPACITANCE

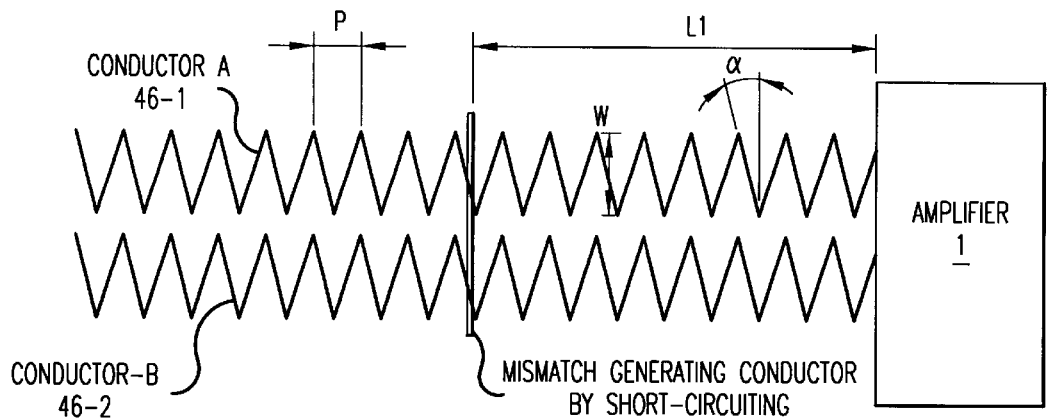
FIG. 13A AN EXAMPLE OF SAW-TEETH WAVEFORM PARALLEL CONDUCTOR
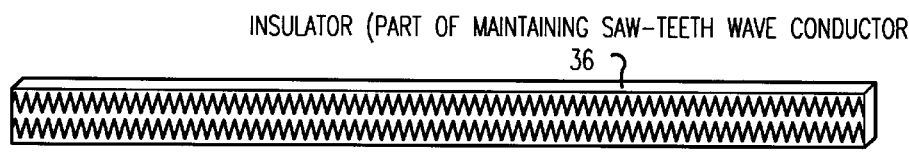
FIG. 13B AN EXAMPLE OF SAW-TEETH WAVE FORMED ON THE INSULATOR
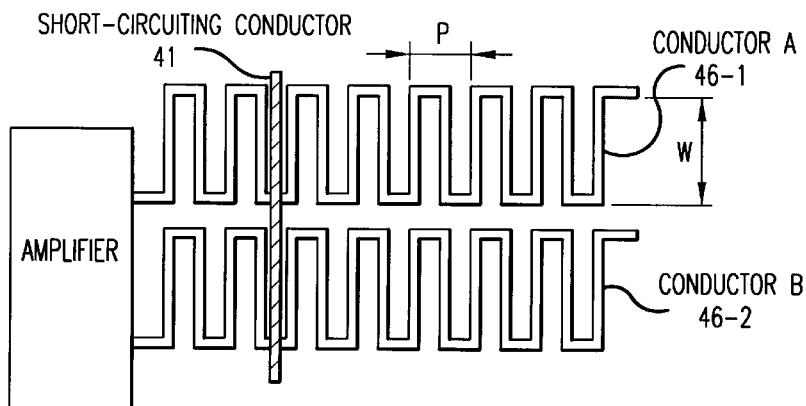
FIG. 13C A SQUARE-FORM PARALLEL CONDUCTOR
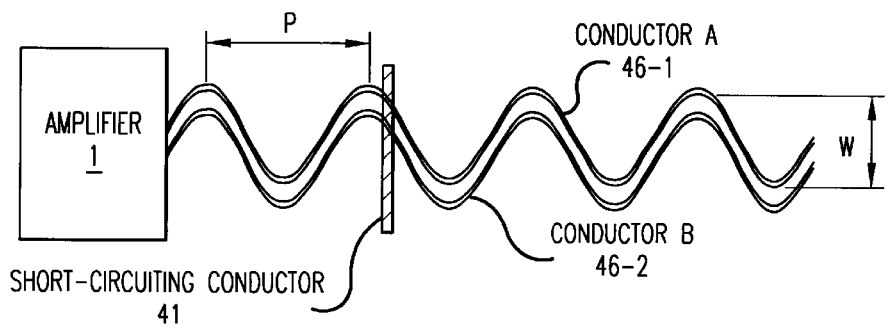
FIG. 13D A SINE-WAVEFORM PARALLEL CONDUCTOR

A CONDUCTOR WINDING DEVICE FOR HIGH RESOLUTION

A CONDUCTOR WINDING DEVICE FOR HIGH RESOLUTION

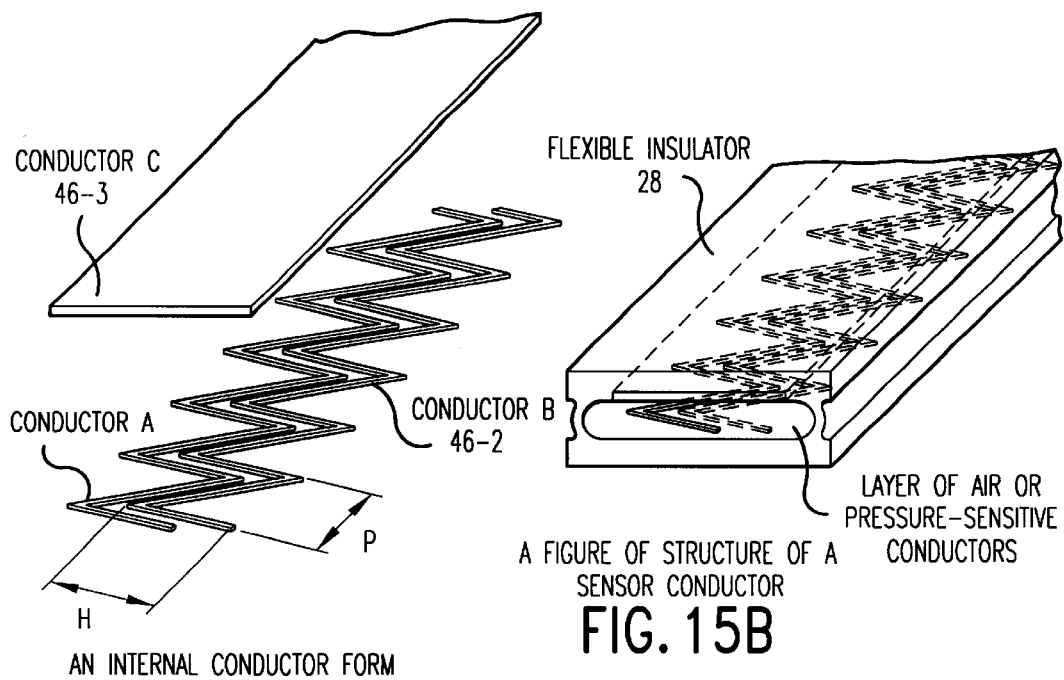
FIG. 15A AN INTERNAL CONDUCTOR FORM
FIG. 15B A FIGURE OF STRUCTURE OF A SENSOR CONDUCTOR
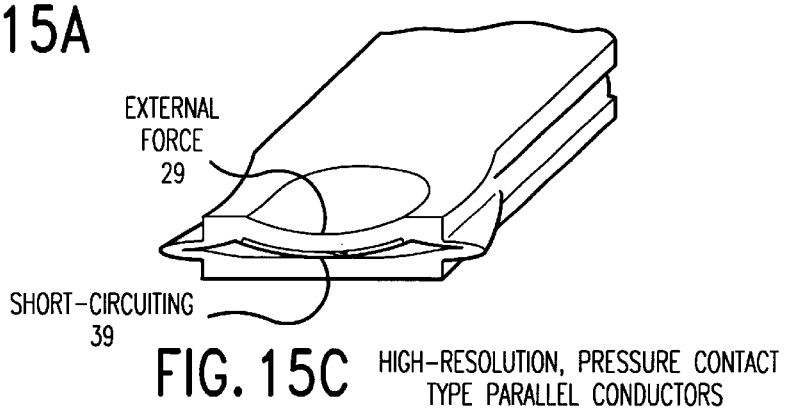
FIG. 15C HIGH-RESOLUTION, PRESSURE CONTACT TYPE PARALLEL CONDUCTORS
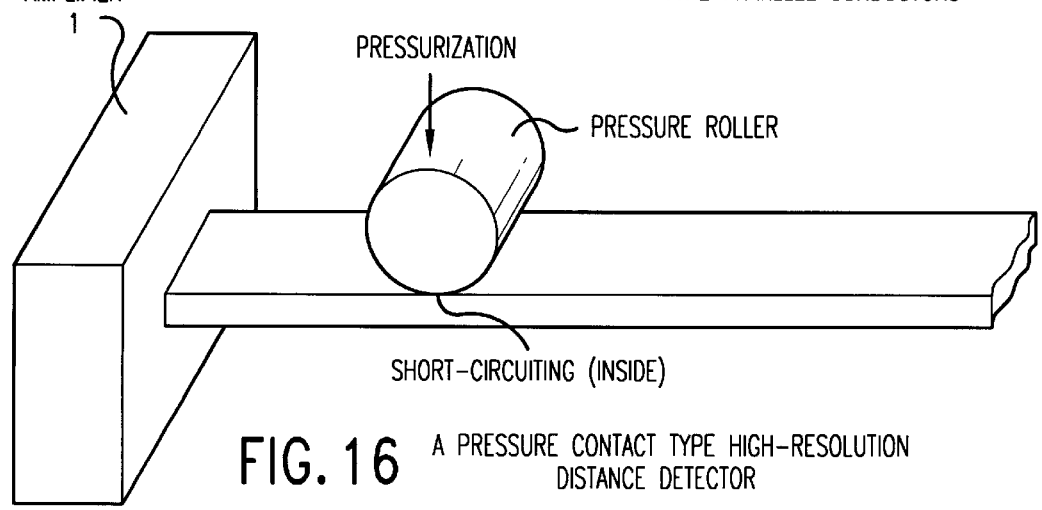
FIG. 16 A PRESSURE CONTACT TYPE HIGH-RESOLUTION DISTANCE DETECTOR

A PARALLEL CONDUCTOR

A PARALLEL CONDUCTOR

A FIGURE OF A COIL-FORM PARALLEL CONDUCTOR

A EXAMPLE OF A PARALLEL CONDUCTOR

A EXAMPLE OF A PARALLEL CONDUCTOR

A EXAMPLE OF A PARALLEL CONDUCTOR

A EXAMPLE OF A PARALLEL CONDUCTOR

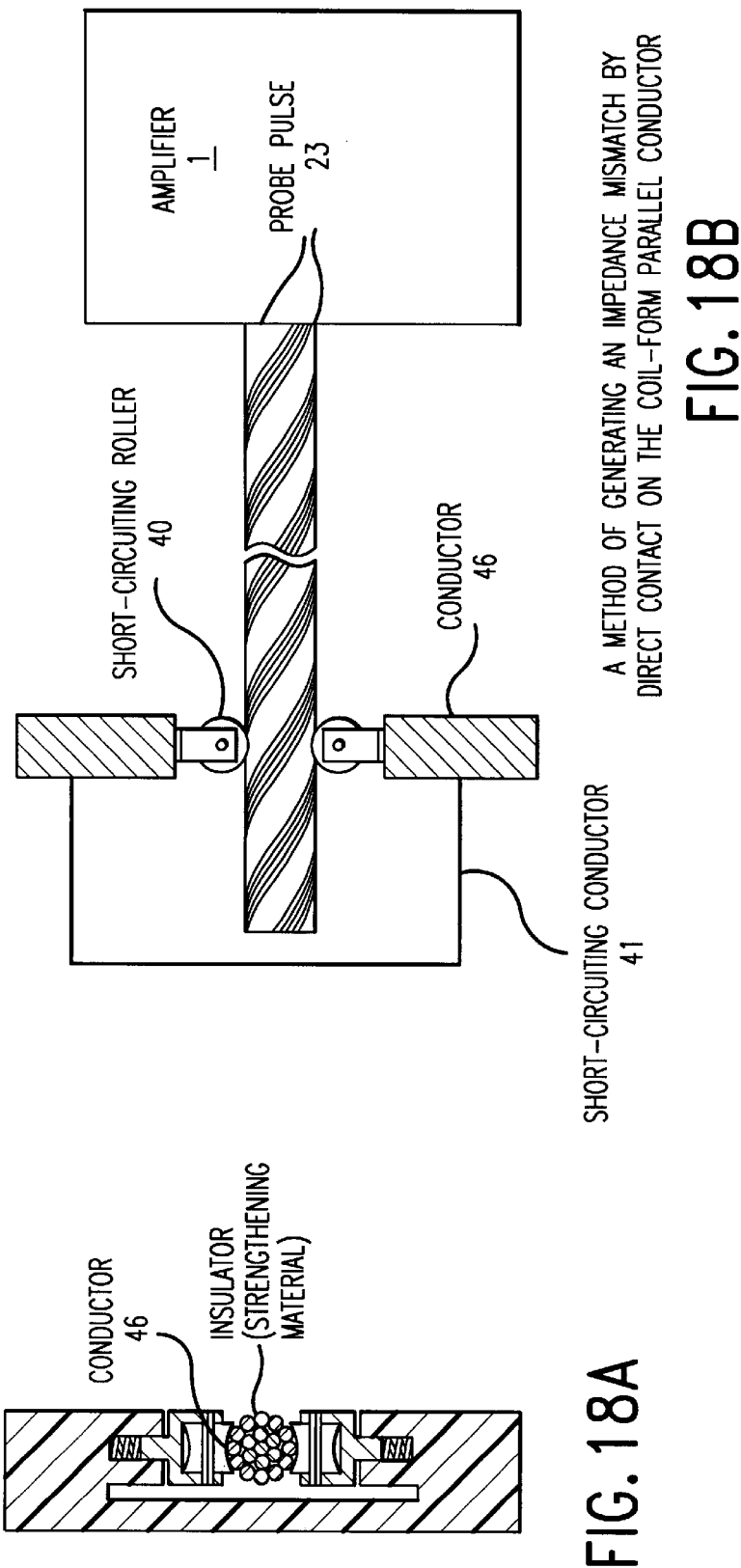

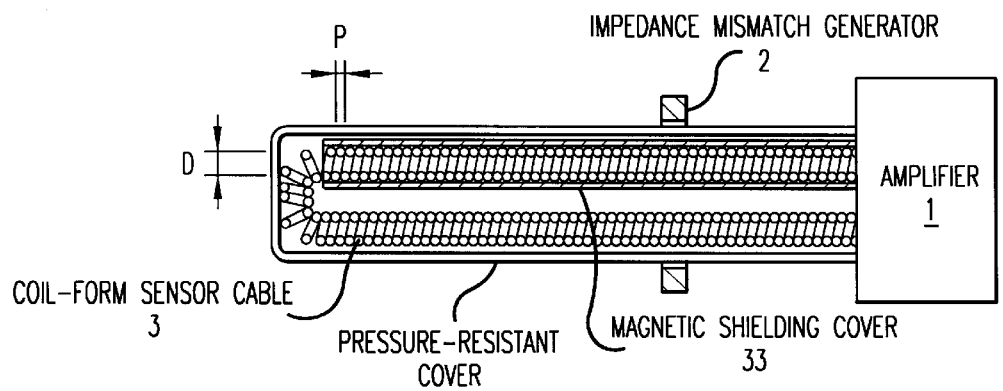
A METHOD OF GENERATING A MISMATCH ON THE COIL
FIG. 19A
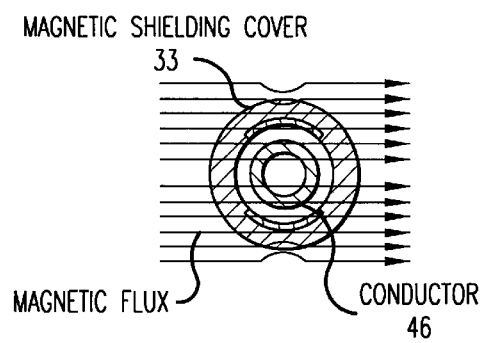
A METHOD OF SHIELDING FROM MAGNETIC FLUX
FIG. 19B
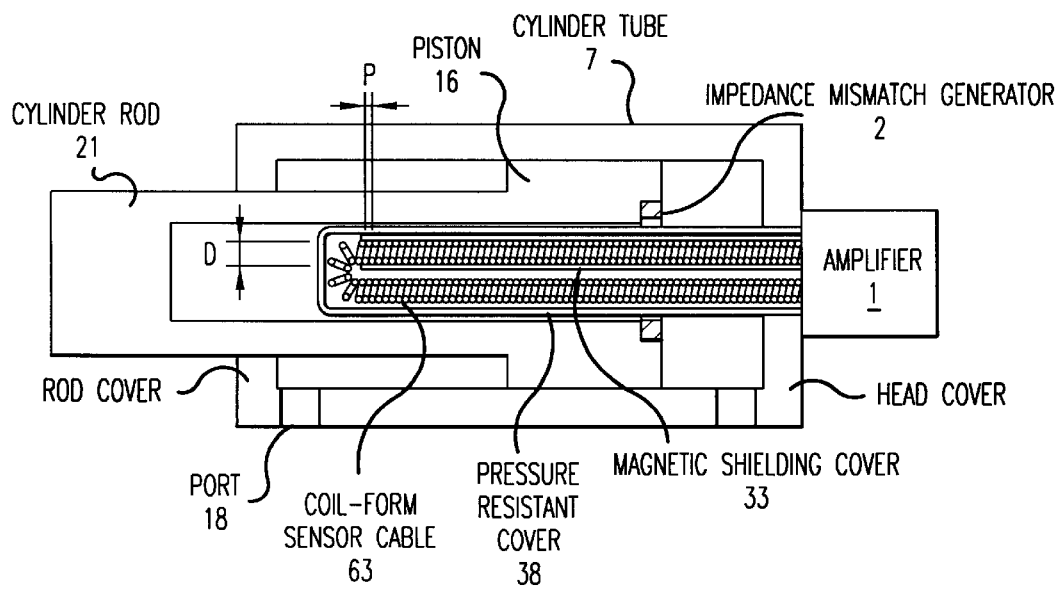
AN EXAMPLE OF INSTALLING INSIDE A CYLINDER  FIG. 19C

A LIQUID LEVEL DETECTOR

A HIGH-RESOLUTION LIQUID LEVEL DETECTOR

DISTANCE MEASURING APPARATUS

BACKGROUND OF THE INVENTION

1. Field of the Invention

The present invention relates to measurement of long distance or position such as measuring the traveling range of a frame of a truck crane, the position of a cylinder rod, the position of a carriage used in a vertical parking lot or an automated warehouse, the position of a container carrier, or the position of a top-running crane, and such as in a detector-equipped pneumatic cylinder or a tank liquid level meter.

2. Description of the Prior Art

There have been known some conventional methods of measuring a long distance; for example, a method using a radar or a laser beam, a technique for measuring the number of windings of a wire over a reel in which a winding detector is installed and also the angle of the winding to determine a position, and a technique for measuring the angle and the number of revolutions of a wheel which is equipped with a revolution detector and urged against a rail or the like to calculate the distance.

Such conventional distance measuring methods have disadvantages. More particularly, the accuracy of a radar method and a laser beam method may largely be affected by local climate such as sunlight levels or raining. In the method using a wire and a reel, the winding length per revolution of the wire may be varied due to change in the winding radius or rough winding. The method using a rail and a wheel may cause the wheel to slip and change its number of revolutions resulting in measurement error and in addition, its measuring of the revolution involves repeat (incremental counting) of the signal at each revolution hence requiring resetting of the origin when the measuring apparatus has been switched off and started again. Therefore, those will be less reliable in the continuous operation in any factory automated application or outdoor use.

SUMMARY OF THE INVENTION

An object of the present invention is thus to provide a distance measuring apparatus which is based on improved physical characteristics allowing the measurement of long distance to be carried out in absolute (not incremental) units and its accuracy to be hardly declined by any environmental change such as raining climate or temperature change.

For achievement of the foregoing object, a distance measuring apparatus according to the present invention is featured by concerning that the propagation speed of voltage across a conductor is stable regardless of a change in the external environmental conditions and measuring the propagating time of the voltage to calculate a distance.

The propagation speed of voltage across a conductor depends on the material of the conductor and generally is very high. With a conductor, e.g. a copper wire, where the propagation speed of voltage is substantially 1 meter per 5 nanoseconds (ns), a high-speed counter having a resolution time of more than 0.05 ns is needed for obtaining a resolution distance of 1 cm.

The present invention is directed to a distance measuring principle for measuring a distance at higher repeatability, a mechanical means for precisely pointing a target, and an electrical means for measuring such a high-speed event.

Assuming that a parallel conductor in an equivalent circuit shown in FIG. 1 is arranged in an equivalent state where the inductance is L, the resistance is R, and the capacitance is C, the introduction of a pulse at one end of the parallel conductor causes its voltage to propagate forward throughout the parallel conductor and after reaching at the other end, to be reflected back to the introduced end.

A change in the voltage is induced by the reflection depending on the condition of joint at the other end. Also, when an impedance mismatch such as shown in FIGS. 2-A, 2-B, 2-C, or 2-D occurs in the conductor, the voltage is reflected at the impedance mismatching point.

It is also assumed that the reflected wave received initially is a primary reflected wave and a reflection of the reflected wave on the introduced end where the voltage is inverted is a secondary reflected wave. The duration of time from the introduction of a pulse to the receipt of the primary reflected wave is determined by the propagation speed of voltage across the conductor and hardly affected by any external environmental change.

For mechanically imposing an impedance mismatch from the outside, a structure comprising one or some of the resistance R, the inductance L, and the capacitance C is provided and exposed adjacent to or directly on an intermediate portion of the parallel conductor.

Because a high-speed counter having a bulky construction is needed for measuring at a high resolution level the duration of time from the introduction of pulse to the receipt of the primary reflected wave, it is provided in the form of a high-speed analog circuit according to the present invention which is simple in the construction and high in the reliability for measuring the time.

Also, since the rise time of the voltage at the pulse introduction directly affects the measurement of a distance, a mechanical scheme for eliminating such drawback is provided.

The apparatus of the present invention permits the parallel conductor(s) to be arbitrarily bent for measuring the distance by means of reflection in a closed space such as the parallel conductor but not in an open space such as with the radar, is based on the propagation speed of voltage across the parallel conductor for measuring the distance hence having minimum interruption from external disturbance, and uses the known conductor for finding the propagation speed of voltage thus allowing absolute position measurement. Therefore, when two parallel conductors which are located at the same distance and different in material are compared, their materials can be classified separately by examining a difference between their propagation speeds.

The apparatus of the present invention converts the time into voltages without the use of a high-speed counter hence permitting very high speed processing of the time at a short distance or measurement of the distance and when employs a flexible conductor(s), enables to measure an object which is bent or has a curvature and can thus be used in a factory automation application of not conventional, new type.

BRIEF DESCRIPTION OF THE DRAWINGS

FIG. 1: an equivalent circuit of a parallel conductor simulated in an equivalent state.

FIGS. 2A–2D: a mismatch generating equivalent circuit of a parallel conductor.

FIGS. 13A–13D: a parallel conductor for providing a higher resolution.

FIGS. 15A–15C: high-resolution, pressure contact type parallel conductors.

FIG. 16: a pressure contact type high-resolution distance detector.

FIGS. 18A–18B: a method of generating an impedance mismatch by direct contact on the coil-form parallel conductor.

FIGS. 19A–19C: a distance detector having a higher resolution and its installation in a cylinder.

DETAILED DESCRIPTION OF THE PREFERRED EMBODIMENTS

Embodiment 1

A distance measuring apparatus according to the present invention is illustrated assuming that the maximum distance Lt to be measured is 100 meters and the propagation speed (Ve) of a voltage propagating through a conductor is 5 ns/m (nanoseconds per meter).

Figure 3A:
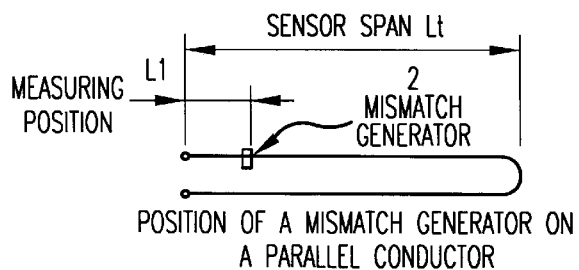
FIGS. 3A–3E: relationship between the position of a mismatch generator and reflected voltages.
Figure 3B:
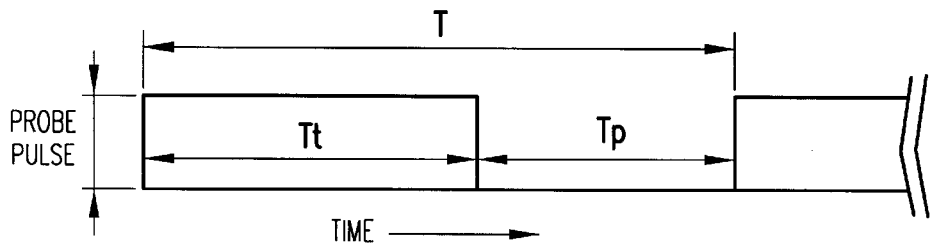
Figure 3C:
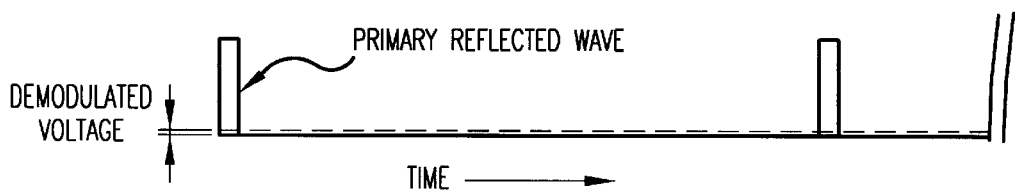
Figure 3D:
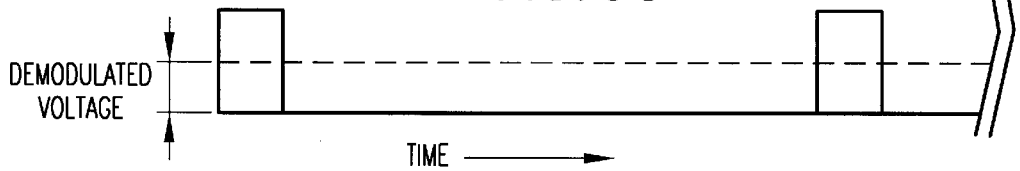
Figure 3E:
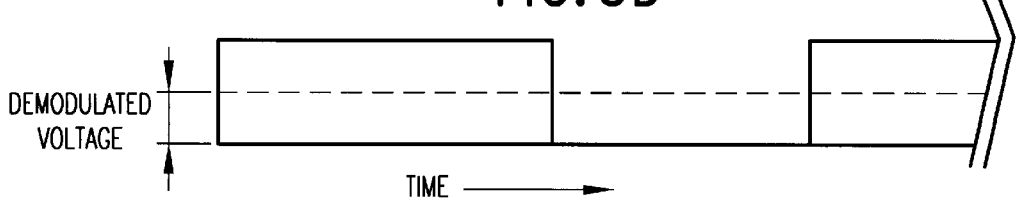
Figure 4A:
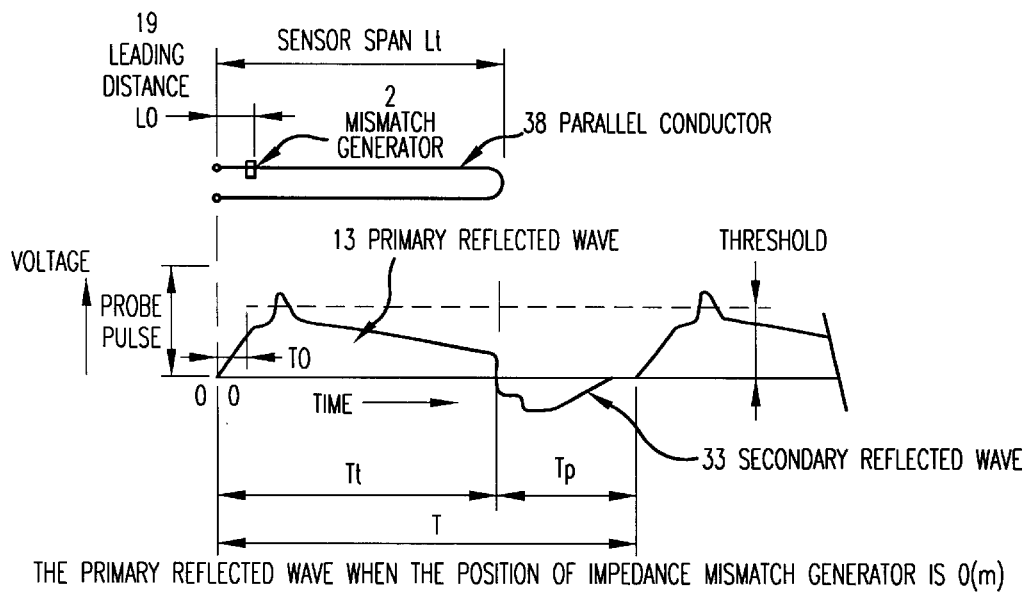
FIGS. 4A–4C: relationship between reflected waveforms and the position of an impedance mismatch generator.
Figure 4B:
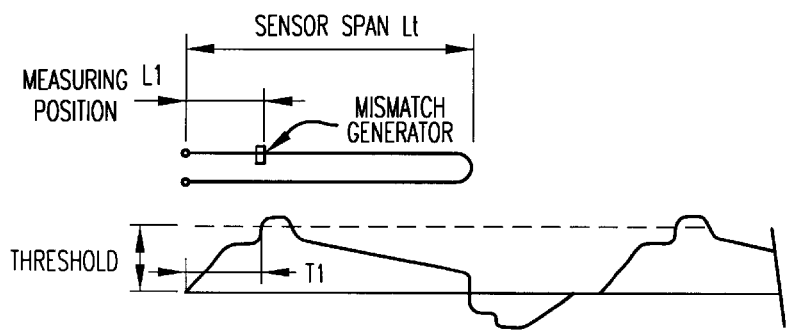
Figure 4C:
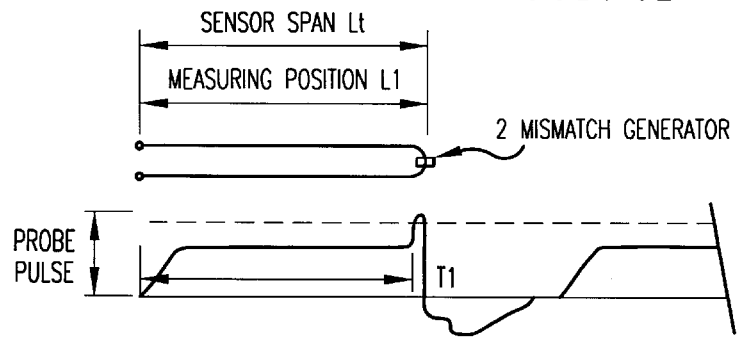

As shown in FIGS. 3 and 4, T1 is 1 $\mu$s (microsecond) determined from multiplication of two times the distance Lt (2×100 m) by Ve (5 ns/m). When the secondary reflected wave terminates within a time shorter than Tt with the impedance of a parallel conductor not very high, Tp=Tt is given and then T=Tt+Tp=2×Tt is established.

Accordingly, T is 2×Tt which is equal to 2 $\mu$s (microseconds) and the frequency F of the impressed pulse is 500 KH (kilohertz) determined from division of one second by T.

In case that no impedance mismatch exists in the circuit, the primary reflected wave is generated 1 $\mu$s later. Then, the overall length of the conductor is 200 m determined from division of 1 $\mu$s by the propagation speed of voltage Ve (5 ns/m). As the propagation is forward and backward, the span of the parallel conductor is calculated from division of the length by two, i.e. 100 m.

When an impedance mismatch exists at an intermediate L1, the primary reflected wave is generated T1 later. The distance to the impedance mismatch to be measured is hence determined by dividing T1 by Ve and then by 2.

For analyzing the measured time at a higher resolution, it is needed to find a small time change. For the purpose, a technique for translating the time into a voltage is used as described below.

Figure 5:
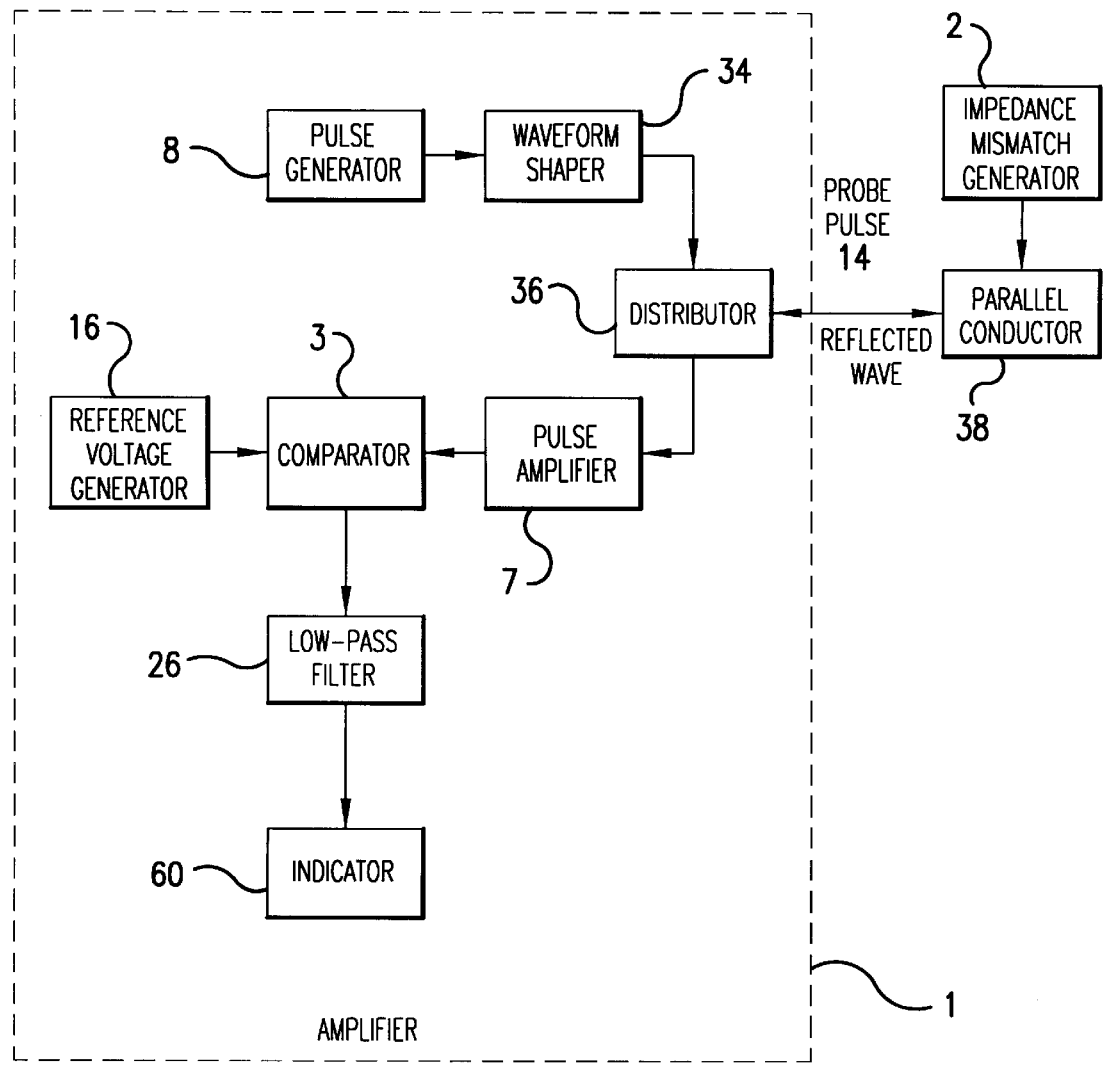
FIG. 5: a block diagram of a distance detector for Embodiment 1.

As shown in FIG. 5, pulses of a frequency of F hertz produced in a pulse generator 8 are shaped to a square wave by a wave shaper 34 and transmitted to a distributor 36 from which introducing pulses 14 are applied to a parallel conductor 38.

The reflected wave from the parallel conductor 38 is passed via the distributor 36 to the pulse amplifier 7 and compared by a comparator 3 with a signal received from a reference voltage generator 16. Upon the two signals being found equal, the release of the reference voltage is canceled and the product of the reference voltage and the time T1 during which the reference voltage is released is divided by a reference period T to determine an average voltage 37. The average voltage is proportional to a duration in which the introducing voltage applied is propagated to an impedance mismatch generator 2 and then returned back to the introducing point. Accordingly, the calculation of the average voltage involves the measurement of a distance from the pulse generator to the impedance mismatch generator 2 located on an intermediate point of the parallel conductor 38.

Embodiment 2

Figure 6:
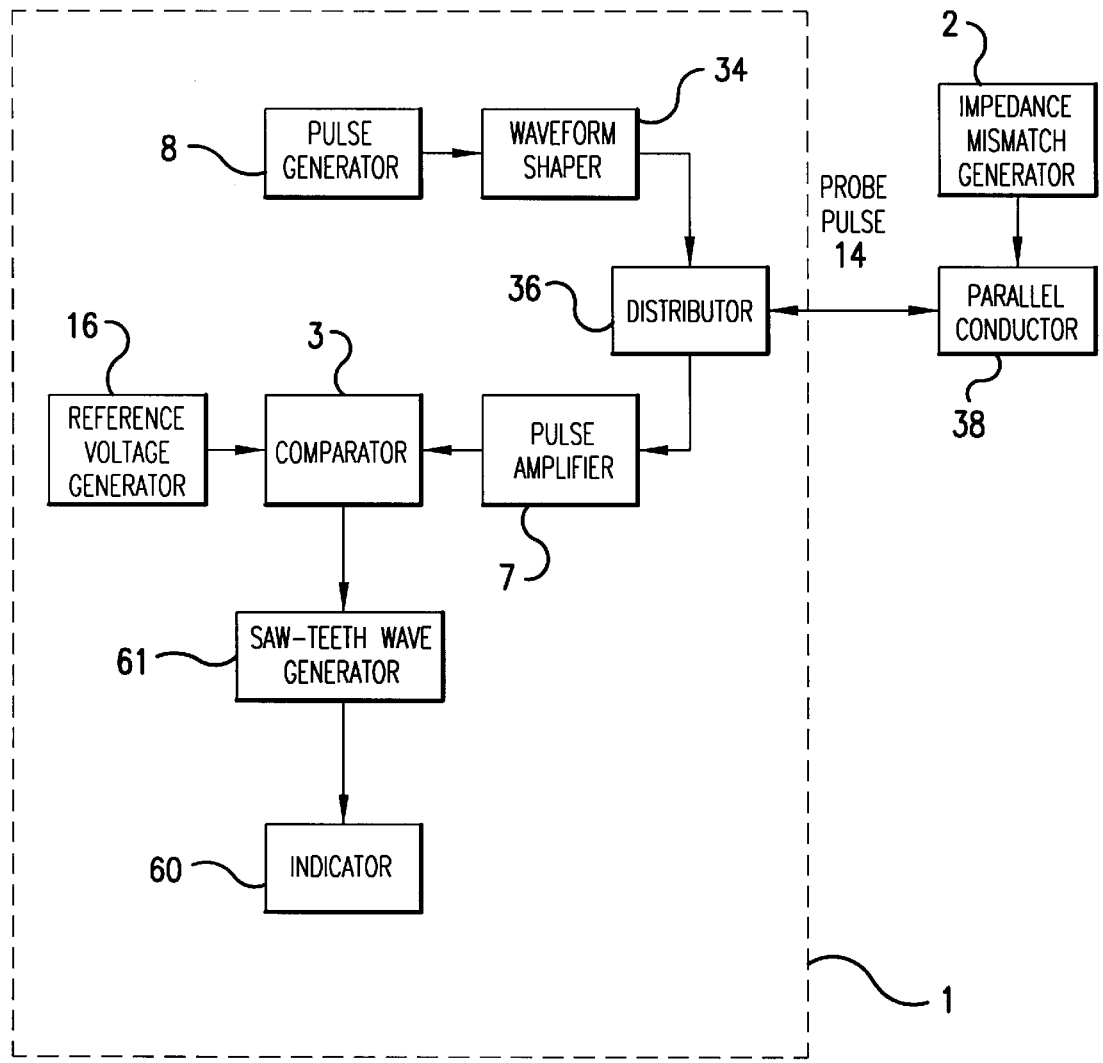
FIG. 6: a block diagram of a distance detector for Embodiment 2.
Figure 7A:
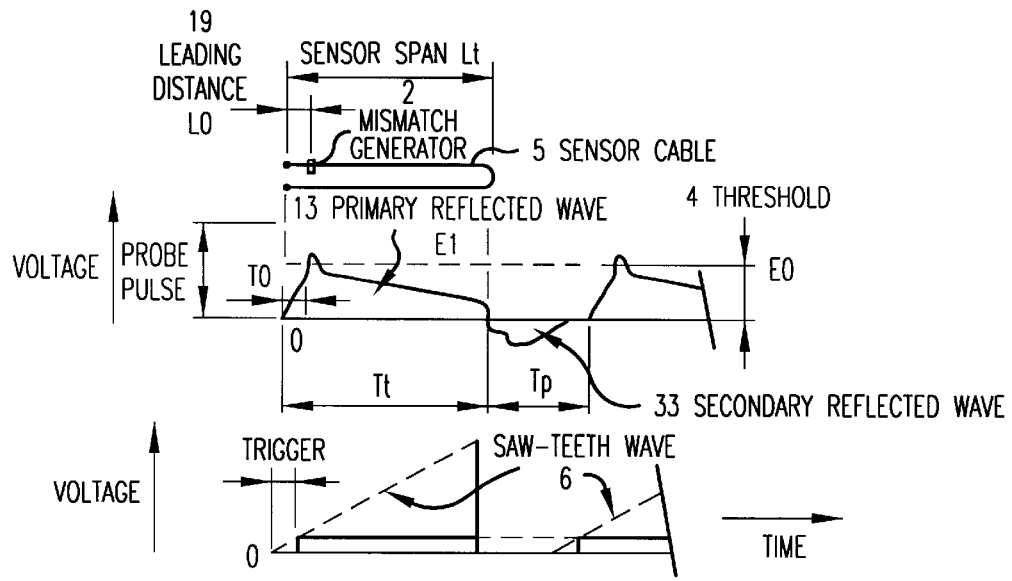
FIGS. 7A–7C: methods of measuring a distance with the use of a saw-teeth wave.
Figure 7B:
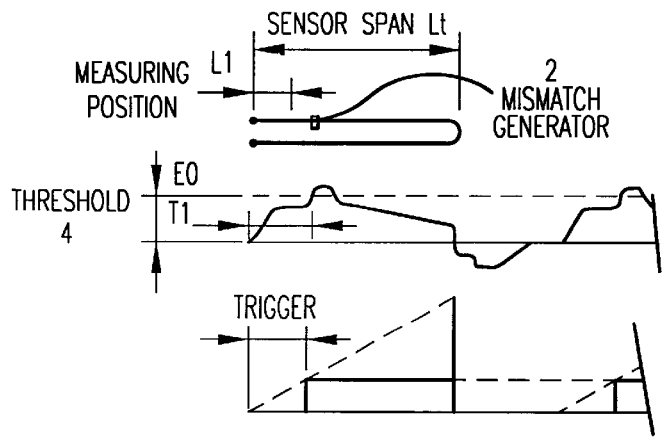
Figure 7C:
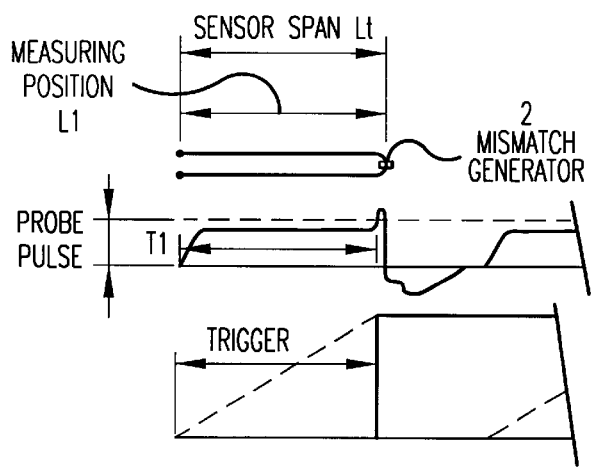
Figure 8A:
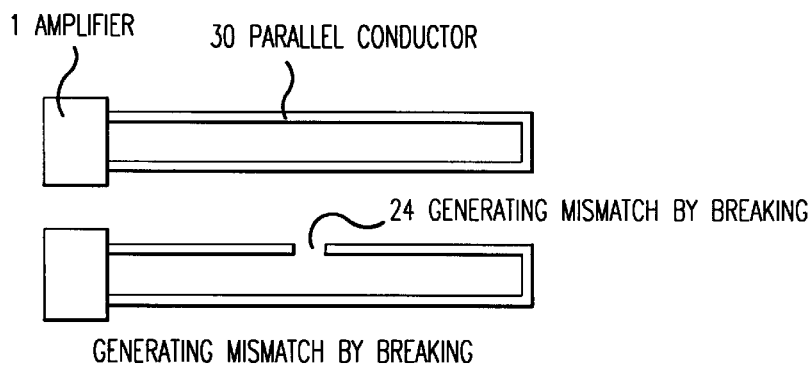
FIGS. 8A–8D: methods of mechanically generating a mismatch for Embodiment 3.
Figure 8B:
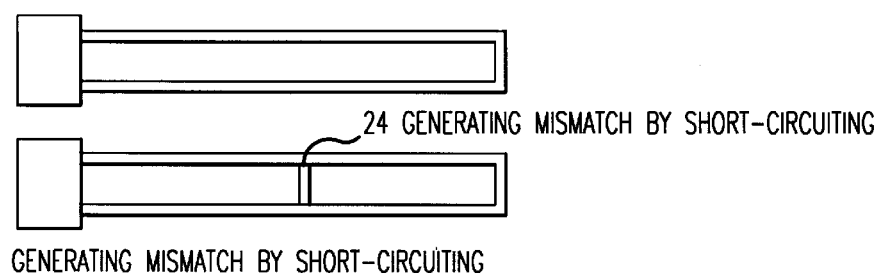
Figure 8C:
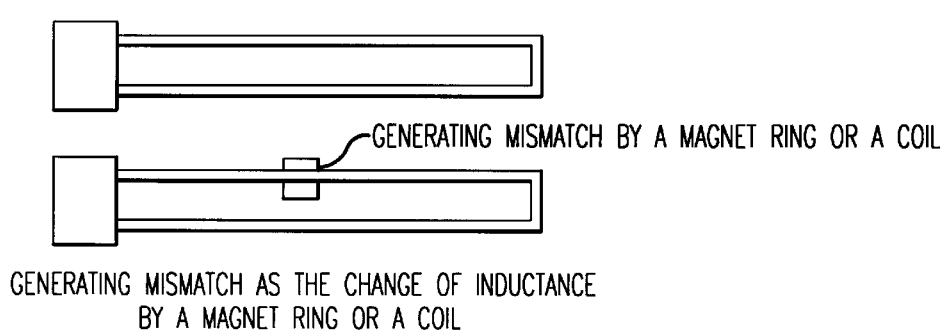
Figure 8D:
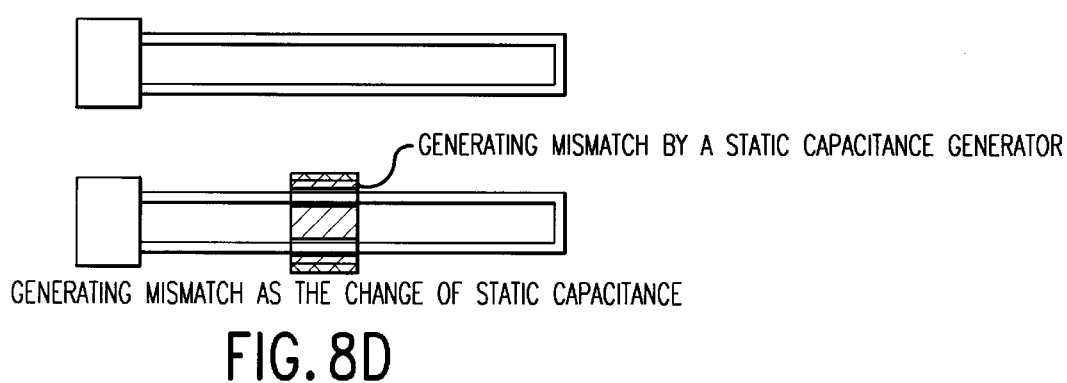

Assuming that the span of a sensor cable 5 is Lt, the leading distance 19 is L0, and the distance between the sensor cable 5 and the impedance mismatch generator 2 is L1, a threshold level 4 of E0 is released from the reference voltage generator 16, the introducing pulse is applied, and simultaneously a saw-tooth wave voltage 6 is released from the saw-tooth wave generator 61, as shown in FIGS. 6 and 7. When it is judged by the comparator 3 that the primary reflected wave 13 of the saw-tooth voltage 6 exceeds the threshold 4 of E0, the boosting of the saw-tooth wave is ceased and the detecting of the voltage at the time involves the measurement of the distance between the pulse introducing end of the sensor cable 5 and the impedance mismatch generator 2.

Embodiment 3

Methods of generating an impedance mismatch include short-circuiting (24) between two portions of the parallel conductor 30 with the use of a change in resistance as shown in FIGS. 8A–8D, causing an abrupt thermal change in one of the two portions of the parallel conductor 30 to produce a change in resistance, having a magnet ring 11 or a coil of high-frequency responding type brought close to the parallel conductor 30 for detecting variations in inductance, and varying the static capacitance between the two portions of the parallel conductor 30 with the use of a dielectric body. For good response to changes in the inductance according to the present invention, Mn-Zn ferrite, Ni-Zn ferrite, carbonyl iron dust, or the like which is low in magnetic permeability and high in resistivity may preferably be used.

Figure 9:
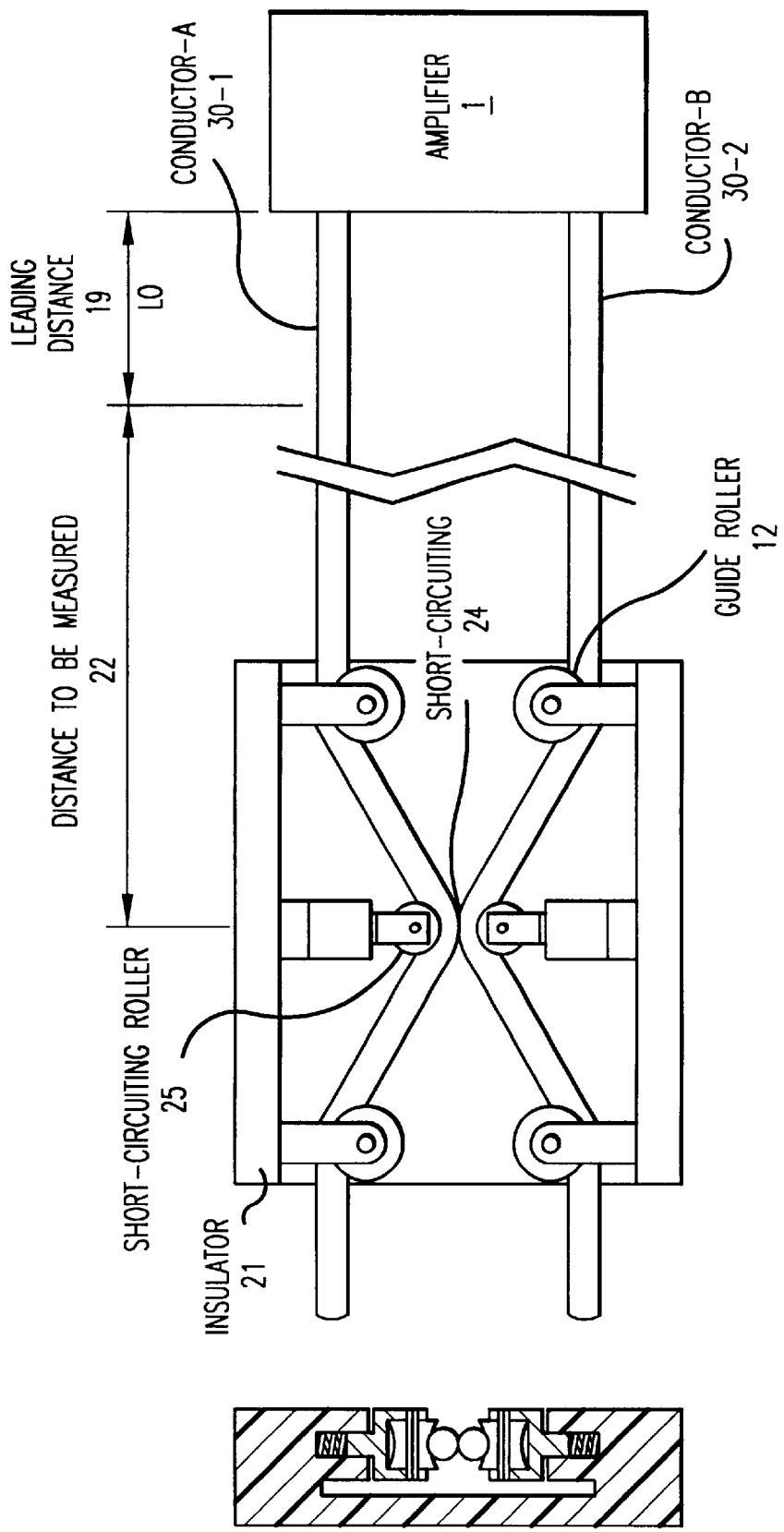
FIG. 9: a contact-type distance measuring mechanism A for parallel conductors.
Figure 10:
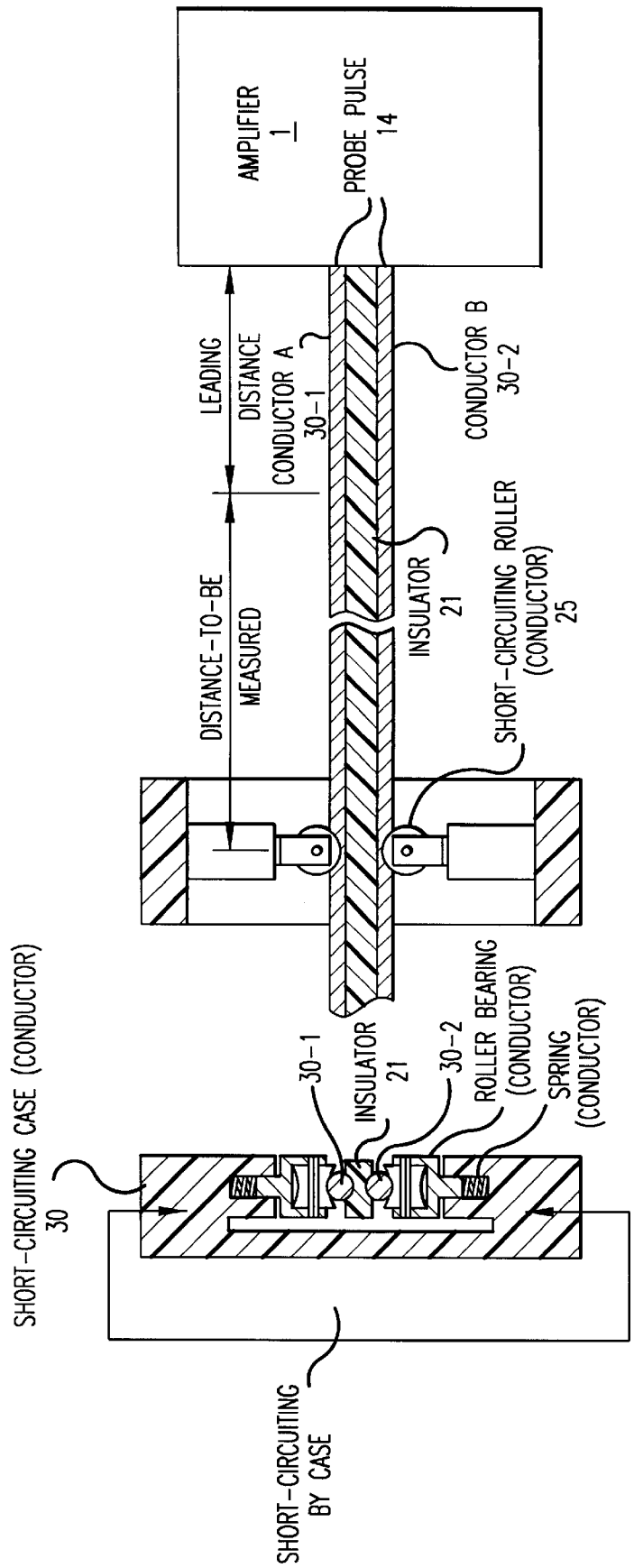
FIG. 10: a contact-type distance measuring mechanism B for parallel conductors.

A example of the mechanism for causing an impedance mismatch on the parallel conductor by using short-circuiting rolls 25 for directly producing an event of short-circuit is illustrated in FIG. 9, and another example of the same mechanism by using a stationary case 30 through which the short-circuiting rolls are short-circuited is illustrated in FIG. 10.

Embodiment 4

Figure 11A:
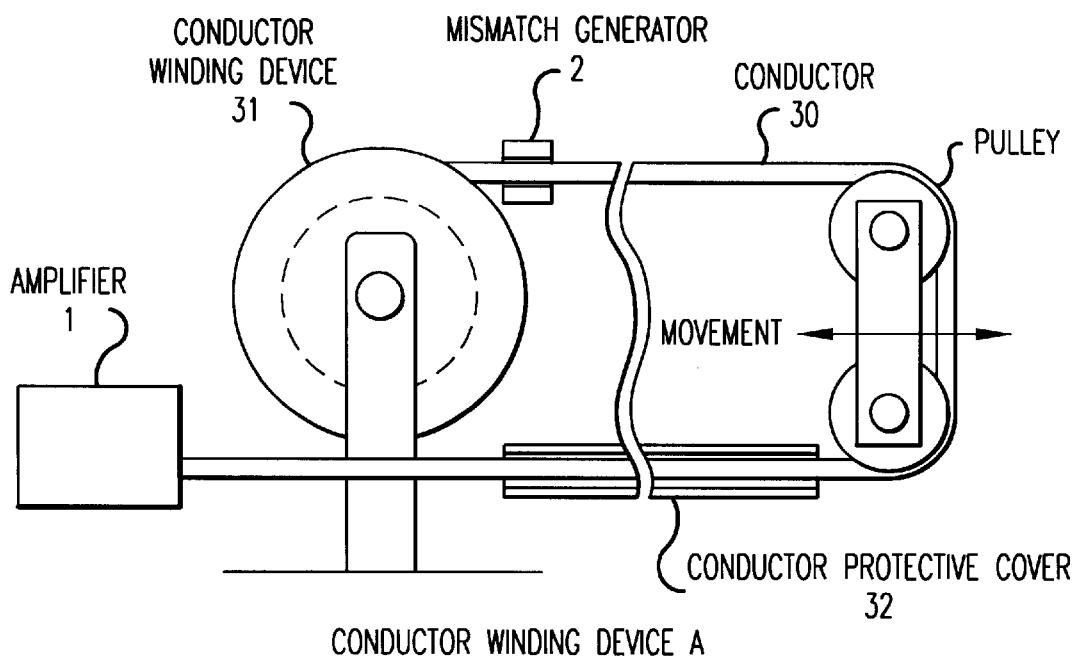
FIGS. 11A–11B: parallel conductor rewinding device A.
Figure 11B:
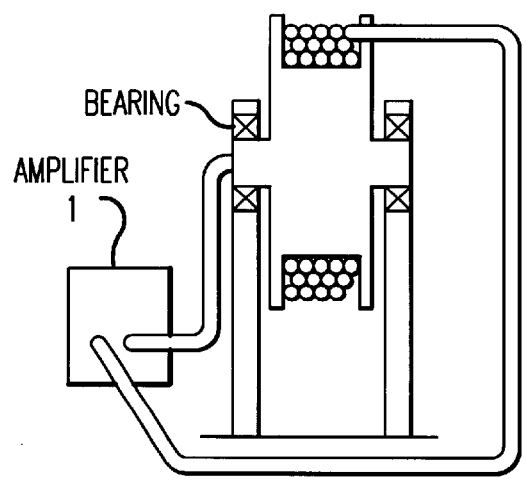
Figure 12:
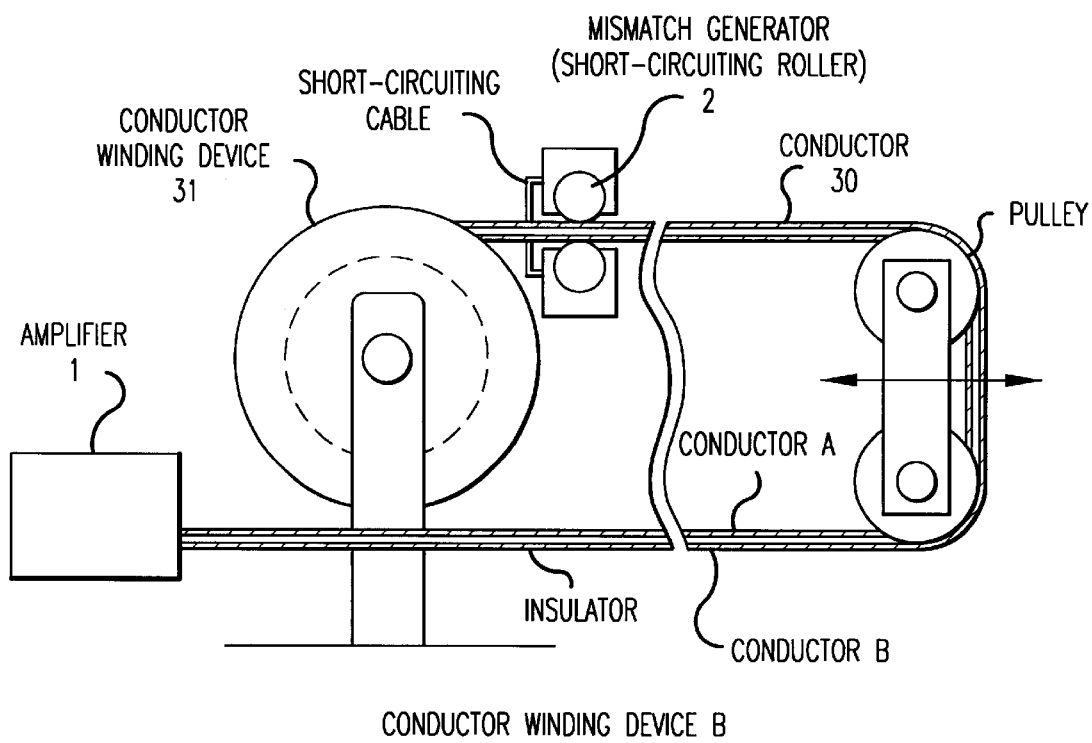

Illustrated in FIGS. 11A, 11B and 12 are examples, each comprising an amplifier 1, parallel conductors 38, an impedance mismatch generator 2, and a parallel conductor winding device 31 so that the parallel conductors can be wound to and from the parallel conductor winding device with the impedance mismatch generator 2 set stationary for measuring the moving distance of pulleys.

Embodiment 5

An arrangement is shown in FIGS. 13A to 13D where the sensor cable is composed of two conductors securely mounted in parallel to each other and aligned in a saw-teeth, square-wave, or sine-wave form on an insulating body so that the overall length of the parallel conductors are increased as compared with the distance to be actually measured thus to extend the time before the reflected voltage is received for increasing the resolution of the measurement. The two parallel conductors A and B of the sensor cable are then short-circuited with a short-circuiting conductor to generate an impedance mismatch between the two parallel conductors.

The overall length of the sensor cable having the above arrangement, when the saw-teeth waveform is used, is expressed by $1/\sin\alpha$ which is longer than that of the straight conductor. If $\alpha$ is 10 degrees, the length is substantially 5.76 times longer. With the square-waveform, the length is $1+2$ W/P and with the sine-waveform, $\pi\times$W/P. The length of the parallel conductor or the propagation time of voltage will hence be increased as compared with a straight parallel conductor.

Embodiment 6

Figure 14A:
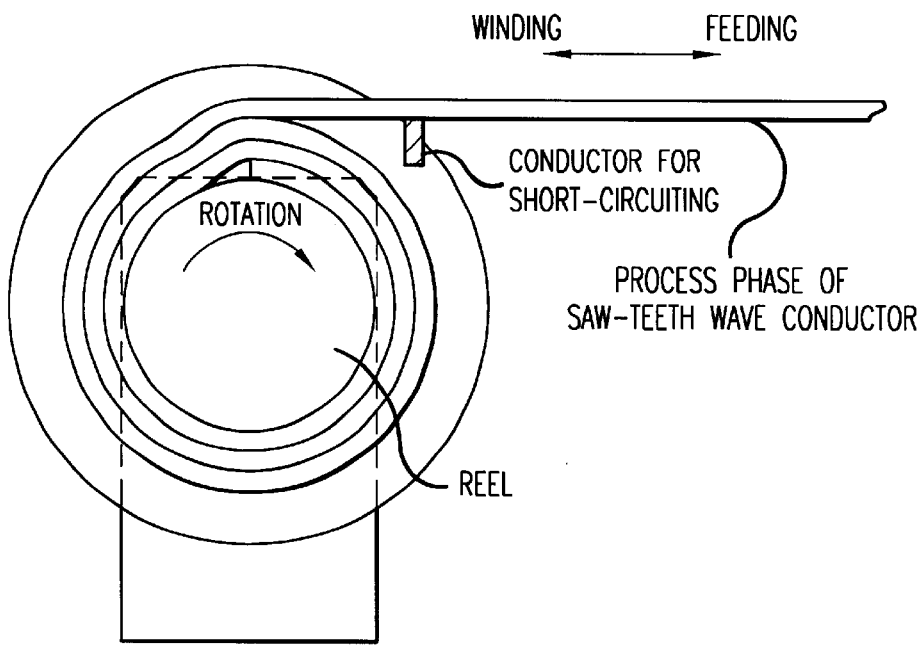
FIGS. 14A–14B: a conductor rewinding device for high resolution.
Figure 14B:
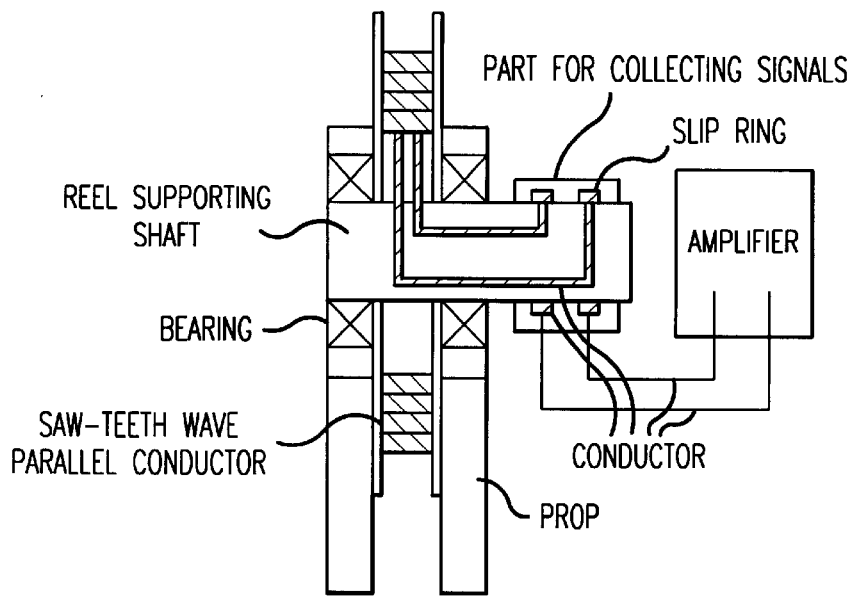

While the two parallel conductors shown in FIGS. 13A–13D are fixedly mounted on an insulating body, FIGS. 14A–14B illustrate another arrangement where the sensor cable comprising strip or cable forms of parallel conductors is wound on a reel and used for measuring the distance by detecting the length of a leading portion of the conductors.

In the latter arrangement, it is needed to transmit an introducing pulse from an amplifier via the rotating reel to the sensor cable. For the purpose, two conductors joined to corresponding ends of their respective parallel conductors are installed in a reel holding shaft made of an insulating material and connected via slip rings to the amplifier.

Embodiment 7

FIGS. 15A–15C show a further arrangement where the parallel conductors are shaped of a saw-teeth waveform (or a square-waveform or sine-waveform) and embedded at both upper and lower sides in a flexible insulating body 28. Also, a layer of air or a pressure-sensitive conductor (a conductor of a fiber or powder form which is laid in the flexible insulating body and, when being stressed by a pressure, comes into direct contact to and causes the two conductors to be short-circuited). As parallel conductors are short-circuited by the external pressure, an impedance mismatch occurs. Shown in FIG. 16 is a similar arrangement where as a pressing unit continuously, its location can be measured.

Embodiment 8

Figure 17A:
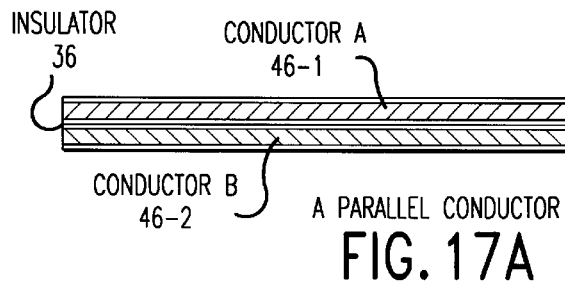
FIGS. 17A–17G: a high-resolution distance detector with a coil-form parallel conductor.
Figure 17B:
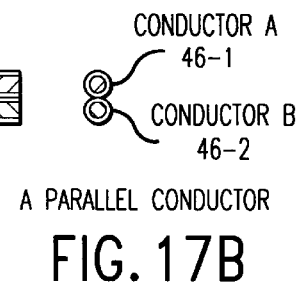
Figure 17C:
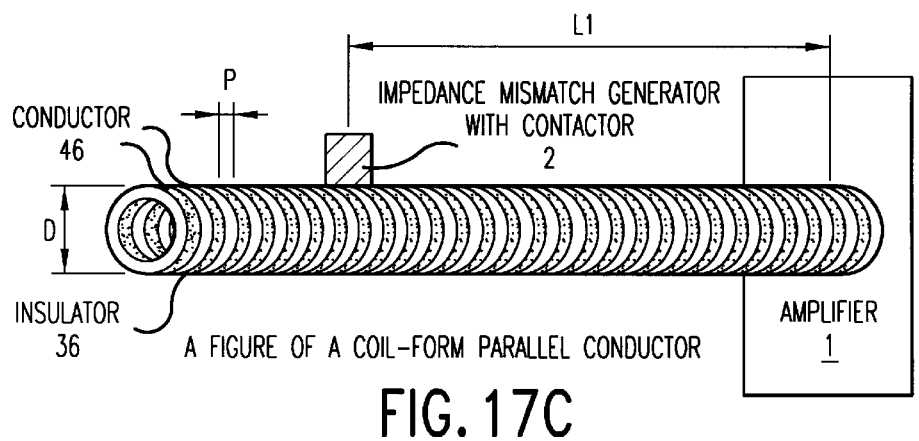
Figure 17D:
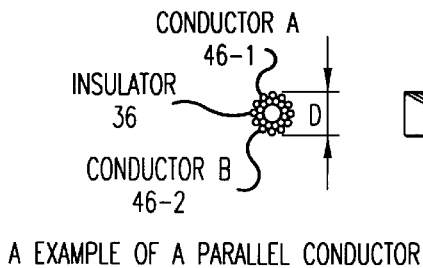
Figure 17E:
Figure 17F:
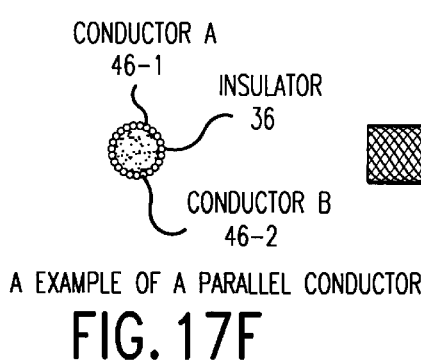
Figure 17G:
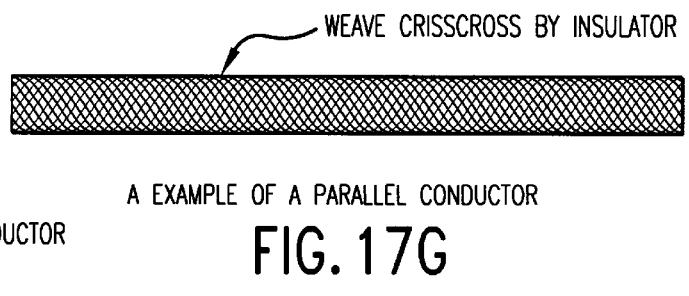

FIGS. 17B, 17C, and 17D illustrate a cable for measuring a distance in which two conductors 46-1 and 46-2 are entirely protected with an insulating material 36, fixedly joined to each other in parallel relationship, and twisted in a coil form. Assuming that the distance between the amplifier 1 and the impedance mismatch generator 2 is L1, the average diameter of the coil cable is D, and the pitch of the coil cable is P, when the impedance mismatch generator 2 is advanced by P in the direction of the measurement, it travels substantially $\pi\times$D along the conductor. Accordingly, this causes the propagation speed of the introducing pulse to be delayed by substantially $\pi\times$D/P hence improving the resolution of the measurement. FIG. 17A shows the two parallel conductors before twisted to have a coil form.

Shown in FIGS. 18A–18B is a mechanism for generating an impedance mismatch by short-circuiting the sensor cable of the coil form with the use of contact rollers pressing from the outside.

Embodiment 9

FIG. 19A illustrates a mechanism for generating an impedance mismatch with a impedance mismatch generator 2 of a magnet core or a magnet ring exposed close to a sensor cable of coiled form 63 to measure a distance where a half of the coiled sensor cable is covered with a magnetic shielding cover 33 having a high magnetic permeability to prevent the effect of a magnetic field from the magnet core or ring. FIG. 19B is a schematic view showing the shielding effect of the magnetic shielding cover and FIG. 19C is an arrangement where a distance measuring apparatus having the above arrangement is set in a cylinder.

As shown, the impedance mismatch generator 2 is fixedly mounted to a cylinder rod 21 and as the cylinder rod travels forward and backward, the impedance mismatch generator 2 is moved hence generating an impedance mismatch on the coil-form sensor cable 63 in the cylinder rod.

In case that the coil-form sensor cable 63 is not covered with the magnetic shielding cover 33, the reflected wave of an introducing pulse induces positive and negative charges on the two parallel conductors which are opposite to each other and thus hardly produce a definite waveform of the voltage at the conductor end. Therefore, it is unfavorable for a method of measuring the distance according to the present invention where the reflected voltage waveform due to an impedance mismatch is detected for the measurement.

Embodiment 10

Figure 20:
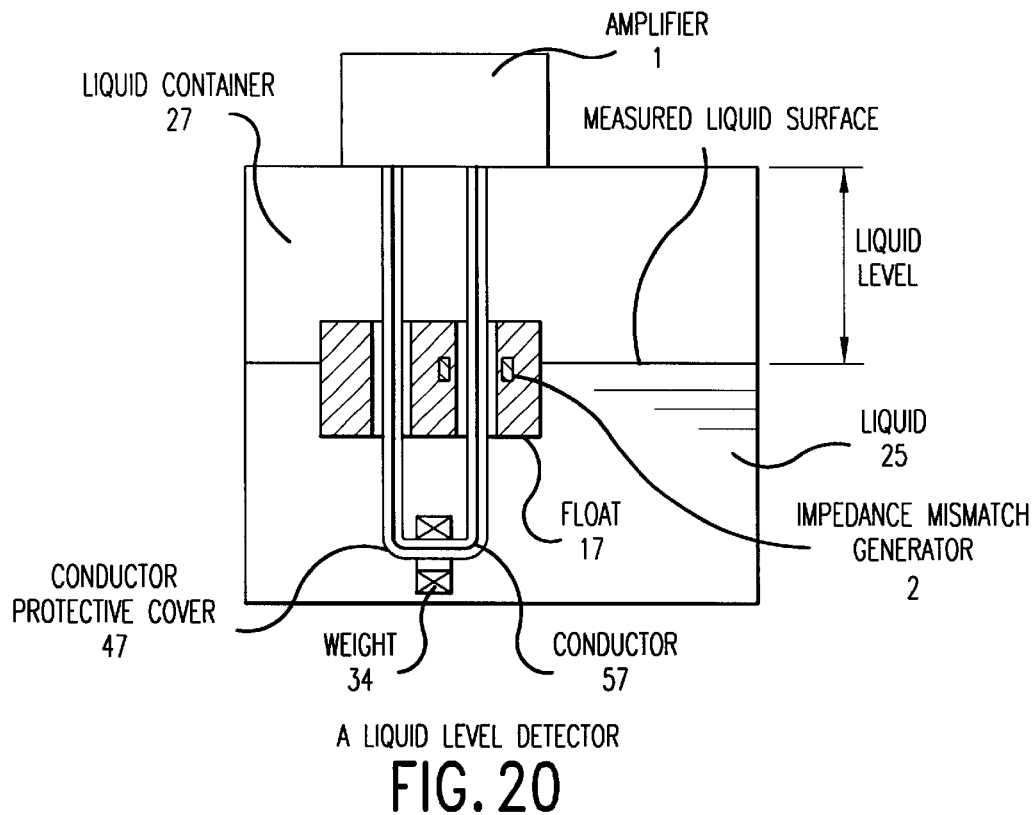
FIG. 20: a liquid level detector with a parallel conductor.

As shown in FIG. 20, for measuring the level of a liquid in a container, the parallel conductor 57 covered with a conductor protective cover 47 is inserted from the upper (or lower) end of the container and immersed in the liquid. The conductor protective cover has a float 17 fitted thereon for sliding movement. A impedance mismatch generator 2 of a magnetic core or a magnet ring is fixedly mounted to the inner wall of the float 17 to set directly about a half of the parallel conductor 57. While the float 17 is lifted up and down by the movement of the liquid level, a weight 34 is mounted to the bottom of the conductor protective cover 47 to prevent it from being lifted up by a buoyancy force of the liquid.

When the level of the liquid moves up and down, the impedance mismatch generator 2 on the float 17 is lifted up and down hence causing an impedance mismatch on the parallel conductor.

As a high-frequency square-waveform pulse from an amplifier 1 has been introduced to one end of the parallel conductor 57 and reflected by the impedance mismatch generator 2, a duration from the introduction of the pulse to the receipt at the introducing end of its primary reflected wave 22 is measured and multiplied by the propagation speed of voltage across the parallel condcutor to calculate a distance between the introducing end of the parallel conductor and the location of the impedance mismatch generator 2. Accordingly, the measurement of the distance determines the position of the float hence finding the level of the liquid.

Figure 21:
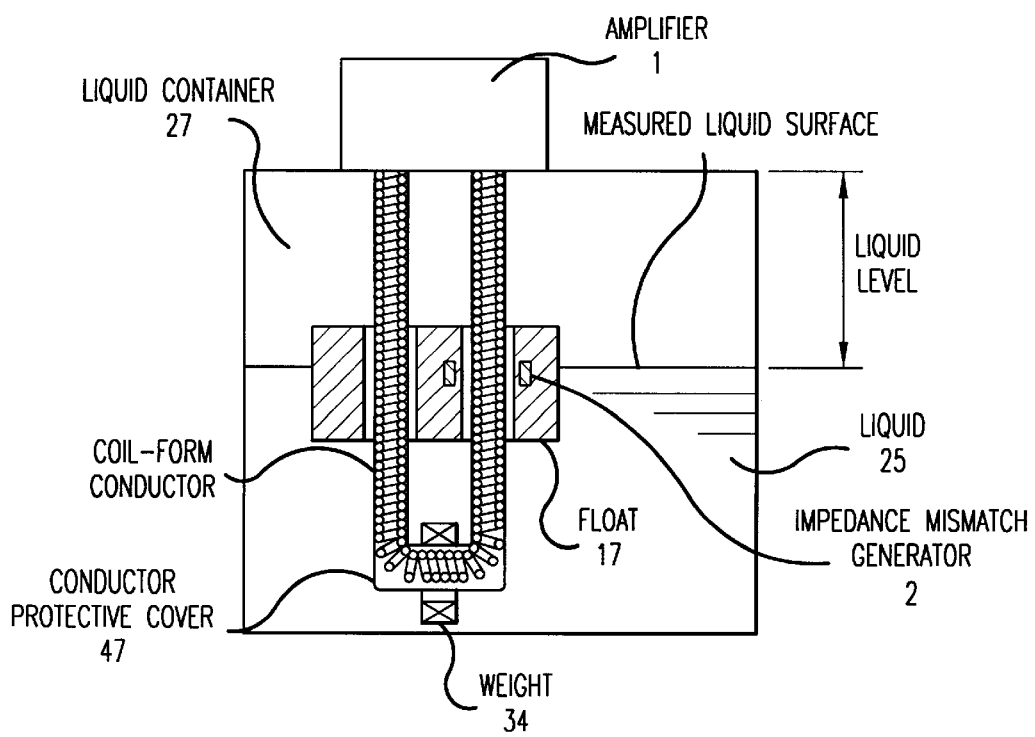
FIG. 21: a liquid level detector with a coil-form parallel conductor.

FIG. 21 illustrates the same mechanism with a coil-form parallel conductor instead of the parallel conductor 57.

What is claimed is:

1. A distance measuring apparatus comprising: a parallel conductor which is simulated as in an impedance equivalent state and of which the propagation speed of voltage is known and having one end thereof to which a high-frequency pulse is introduced; and an impedance mismatch generator arranged to produce an impedance change at a specific portion of the parallel conductor by exposing one of an inductance L, a resistance R and a static capacitance C at a location of one of close and directly to the parallel conductor and mounted to an intermediate region of the parallel conductor, wherein as a primary reflected wave of the introducing pulse is generated at the location of the impedance mismatch generator, a duration from the introduction of the pulse to the receipt of the primary reflected wave at the one end is measured and multiplied by the propagation speed of voltage to determine a distance between the one end of the parallel conductor where the pulse is introduced and the location of the impedance mismatch generator and when it is assumed that the overall length of a sensor cable is LM, the leading distance is L0, the distance between the one end of the sensor cable and the location of the impedance mismatch generator is L1, and the reference voltage is a threshold E0, the measurement is made by applying the introducing pulse and simultaneously directing a saw-teeth waveform generator to generate a saw-teeth wave voltage, and when the comparator detects that a primary reflected wave of E1 exceeds the threshold E0, pausing a boosting action of the saw-teeth wave voltage and saving its voltage level which represents the distance between the one end of the sensor cable and the location of the impedance mismatch generator.

2. A material classifying apparatus employing the distance measuring apparatus defined in claim 1, wherein when it is fixedly assumed that the overall length of the sensor cable is LM, the leading distance is L0, and the distance between one end of the parallel conductor and the location of the impedance mismatch generator is L1, different types of the parallel conductor positioned at the same distance are classified over the quality of materials by measuring output voltages from their respective parallel conductors.

3. A distance measuring apparatus comprising: a parallel conductor which is simulated as in an impedance equivalent state and of which the propagation speed of voltage is known; and an impedance mismatch generator arranged to produce an impedance mismatch at a desired point of the parallel conductor by exposing one of a magnet core and a magnet ring at a location of one of close and directly to the parallel conductor for one of inductance change and making a short-circuiting conductor in direct contact with the parallel conductor for one of short-circuiting and exposing a dielectric body at a location of one of close to and directly to the parallel conductor for capacitance change, in which when a high-frequency square waveform pulse is introduced to one end of the parallel conductor and reflected by the impedance mismatch generator in the propagation of voltage across the conductor, a duration from the introduction of the pulse to the receipt of its primary reflected wave at the introduction end (the one end of the parallel conductor) when the introducing pulse propagates forward and backward is measured and multiplied by the propagation speed of voltage across the conductor to determine a distance between the introduction end of the parallel conductor and the location of the impedance mismatch generator, the improvement arranged that for the purpose of increasing the overall length of the parallel conductor relative to the distance to be measured, the parallel conductor is tailored to a shape where, in three dimensions where the direction of the measurement is along the Y-axis, the parallel conductor is continuously bent to have one of a coil-like, saw-teeth, square-waveform, and sine-waveform configuration in one of the X-axis and Z-axis direction so that when the voltage is supplied to the one end of the parallel conductor, its propagating time is increased as compared with the distance to be actually measured and thus the measurement of the distance is enhanced in resolution.

4. A distance measuring apparatus comprising: a parallel conductor which is simulated as in an impedance equivalent state and of which the propagation speed of voltage is known; and an impedance mismatch generator arranged to produce an impedance mismatch at a desired point of the parallel conductor by exposing one of a magnet core and a magnet ring at a location of one of close and directly to the parallel conductor for one of inductance change and making a short-circuiting conductor in direct contact with the parallel conductor for one of short-circuiting and exposing a dielectric body at a location of one of close to and directly to the parallel conductor for capacitance change, in which when a high-frequency square waveform pulse is introduced to one end of the parallel conductor and reflected by the impedance mismatch generator in the propagation of voltage across the conductor, a duration from the introduction of the pulse to the receipt of its primary reflected wave at the introduction end (the one end of the parallel conductor) when the introducing pulse propagates forward and backward is measured and multiplied by the propagation speed of voltage across the conductor to determine a distance between the introduction end of the parallel conductor and the location of the impedance mismatch generator, the improvement arranged that for the purpose of increasing the overall length of the parallel conductor relative to the distance to be measured, the parallel conductor is tailored to a shape where, in three dimensions where the direction of the measurement is along the Y-axis, the parallel conductor is continuously bent to have one of a coil-like, saw-teeth, square-waveform, and sine-waveform configuration in one of the X-axis and Z-axis direction so that when the voltage is supplied to the one end of the parallel conductor, its propagating time is increased as compared with the distance to be actually measured and thus the measurement of the distance is enhanced in resolution and with the parallel conductor shaped by being continuously bent for increasing the propagation time of the voltage, when it is assumed that the maximum distance to be measured is Lt, the maximum reflection time during when the pulse introduced to the one end of the parallel conductor is propagated forward, reflected at the point of the maximum distance Lt, and returned back to the one end is Tt, and the duration from the secondary reflection of the reflected voltage at the pulse introduction end to the settle down to it decayed level is Tp, the frequency F of the introducing pulse is 1/(Tt+Tp) and wherein the parallel conductor is a sensor cable of which the overall length is Lt, the leading distance is L0, the distance from one end thereof to the impedance mismatch generator is L1, the measurement is made by applying the introducing pulse of square waveform to the one end of the sensor cable and simultaneously introducing a reference voltage for comparison (a threshold) and reference voltage for the measurement, pausing the output of the reference voltage for the measurement upon a comparator detecting that the primary reflected wave E1 exceeds the threshold E0, and dividing the reference voltage for the measurement by the pulse frequency F0 to have an average voltage which represents the distance between the one end of the sensor cable and the location of the mismatch generator.

5. A distance measuring apparatus comprising: a parallel conductor which is simulated as in an impedance equivalent state and of which the propagation speed of voltage is known; and an impedance mismatch generator arranged to produce an impedance mismatch at a desired point of the parallel conductor by exposing one of a magnet core and a magnet ring at a location of one of close and directly to the parallel conductor for one of inductance change and making a short-circuiting conductor in direct contact with the parallel conductor for one of short-circuiting and exposing a dielectric body at a location of one of close to and directly to the parallel conductor for capacitance change, in which when a high-frequency square waveform pulse is introduced to one end of the parallel conductor and reflected by the impedance mismatch generator in the propagation of voltage across the conductor, a duration from the introduction of the pulse to the receipt of its primary reflected wave at the introduction end (the one end of the parallel conductor) when the introducing pulse propagates forward and backward is measured and multiplied by the propagation speed of voltage across the conductor to determine a distance between the introduction end of the parallel conductor and the location of the impedance mismatch generator, the improvement arranged that for the purpose of increasing the overall length of the parallel conductor relative to the distance to be measured, the parallel conductor is tailored to a shape where, in three dimensions where the direction of the measurement is along the Y-axis, the parallel conductor is continuously bent to have one of a coil-like, saw-teeth, square-waveform, and sine-waveform configuration in one of the X-axis and Z-axis direction so that when the voltage is supplied to the one end of the parallel conductor, its propagating time is increased as compared with the distance to be actually measured and thus the measurement of the distance is enhanced in resolution and with the parallel conductor shaped by being continuously bent for increasing the propagation time of the voltage, when it is assumed that the maximum distance to be measured is Lt, the maximum reflection time during when the pulse introduced to the one end of the parallel conductor is propagated forward, reflected at the point of the maximum distance Lt, and returned back to the one end is Tt, and the duration from the secondary reflection of the reflected voltage at the pulse introduction end to the settle down to it decayed level is Tp, the frequency F of the introducing pulse is 1/(Tt+Tp) and wherein the parallel conductor is a sensor cable of which the overall length is Lt, the leading distance is L0, the distance from one end thereof to the impedance mismatch generator is L1, the measurement is made by applying the introducing pulse of square waveform to the one end of the sensor cable and simultaneously introducing a reference voltage for comparison (a threshold) and a saw-teeth waveform voltage of a saw-teeth wave generator, and while confirming at a comparator that the primary reflected wave E1 exceeds the threshold E0, pausing a boosting action of the saw teeth wave voltage to save its peak level which represents the distance between the one end of the sensor cable and the location of the impedance mismatch generator.

6. A distance measuring apparatus comprising: a parallel conductor which is simulated as in an impedance equivalent state and of which the propagation speed of voltage is known; and an impedance mismatch generator arranged to produce an impedance mismatch at a desired point of the parallel conductor by exposing one of a magnet core and a magnet ring at a location of one of close and directly to the parallel conductor for one of inductance change and making a short-circuiting conductor in direct contact with the parallel conductor for one of short-circuiting and exposing a dielectric body at a location of one of close to and directly to the parallel conductor for capacitance change, in which when a high-frequency square waveform pulse is introduced to one end of the parallel conductor and reflected by the impedance mismatch generator in the propagation of voltage across the conductor, a duration from the introduction of the pulse to the receipt of its primary reflected wave at the introduction end (the one end of the parallel conductor) when the introducing pulse propagates forward and backward is measured and multiplied by the propagation speed of voltage across the conductor to determine a distance between the introduction end of the parallel conductor and the location of the impedance mismatch generator, the improvement arranged that for the purpose of increasing the overall length of the parallel conductor relative to the distance to be measured, the parallel conductor is tailored to a shape where, in three dimensions where the direction of the measurement is along the Y-axis, the parallel conductor is continuously bent to have one of a coil-like, saw-teeth, square-waveform, and sine waveform configuration in one of the X-axis and Z-axis direction so that when the voltage is supplied to the one end of the parallel conductor, its propagating time is increased as compared with the distance to be actually measured and thus the measurement of the distance is enhanced in resolution and with the parallel conductor, of which the propagation speed of voltage is known and the impedance is set in an equivalent state, accompanied with the impedance mismatch generator arranged for generating an impedance mismatch on the parallel conductor by exposing one of the magnet core and magnet ring at a location of one of close and directly to the specific portion of the parallel conductor and shaped by being continuously bent for increasing the propagation time of the voltage, the parallel conductor is entirely covered at one half with a magnetic shielding cover, which is high in magnetic permeability, for blocking the effect of magnetic fluxes generated by one of the magnetic core and magnetic ring and is exposed at the other half to the magnetic fluxes of one of the magnetic core and magnetic ring thus to generate an impedance mismatch on the parallel conductor.

* * * * *